United States Patent [19]
Lindner et al.

[11] Patent Number: 5,186,287
[45] Date of Patent: Feb. 16, 1993

[54] SIMPLIFIED MOTOR BRAKE

[75] Inventors: Bernard J. Lindner, Brookfield; Harold Lorenz, Greenfield, both of Wis.

[73] Assignee: Rexnord Corporation, Milwaukee, Wis.

[21] Appl. No.: 618,658

[22] Filed: Nov. 27, 1990

[51] Int. Cl.$^5$ .............................................. B60T 13/04
[52] U.S. Cl. .................................. 188/171; 188/72.3; 188/73.32; 188/216; 188/72.9
[58] Field of Search ............... 188/171, 173, 161, 163, 188/71.1, 71.5, 72.3, 72.1, 72.9, 73.32, 216; 192/90, 70.13, 70.27; 267/153

[56] References Cited

U.S. PATENT DOCUMENTS

| | | | |
|---|---|---|---|
| 2,267,411 | 12/1941 | McNairy | 188/171 |
| 2,620,901 | 12/1952 | Stearns | 188/171 |
| 2,966,240 | 12/1960 | Ande et al. | 188/171 |
| 3,095,068 | 6/1963 | Hansen | 188/171 |
| 3,202,244 | 8/1965 | Vogelsong et al. | 188/171 |
| 3,221,845 | 12/1965 | Hansen | 188/171 |
| 3,288,255 | 11/1966 | Palme | 188/171 |
| 3,289,797 | 12/1966 | Brzezinski et al. | 188/171 |
| 3,337,010 | 8/1967 | Wrensch | 188/171 |
| 3,500,971 | 3/1970 | McCarthy . | |
| 3,525,424 | 8/1970 | McCarthy . | |
| 3,556,266 | 1/1971 | McCarthy . | |
| 3,878,922 | 4/1975 | McCarthy . | |
| 4,042,077 | 8/1977 | McCarthy . | |
| 4,181,201 | 1/1980 | McCarthy . | |
| 4,228,874 | 10/1980 | Brinkmann et al. | 188/163 X |
| 4,570,758 | 2/1986 | Hendricks | 188/171 X |
| 4,798,269 | 1/1989 | Lindner et al. . | |

FOREIGN PATENT DOCUMENTS 916726 1/1963 United Kingdom ................ 188/171

OTHER PUBLICATIONS

"Stearns Spring-Set Disc Brakes Parts List for 55,000 Series", PTC Sheet 309, Oct. 31,1985, pp. S-607-1, FIGS. H, I, J, K, L.

"Stearns Spring-Set Disc Brakes", Catalog No. 200 68910M, Stearns Division, Rexnord Corporation 1989.
"Stearns Spring-Set Disc Brakes Installation and Service Instructions for Series 48,000" Sheet 300.10A, effective Mar. 21, 1989, p. S-700-1, P/N8-078-924,05, Stearns Division, Rexnord Corporation.

*Primary Examiner*—Douglas C. Butler
*Attorney, Agent, or Firm*—Andrus, Sceales, Starke & Sawall

[57] ABSTRACT

A motor brake mechanism (10) includes retaining structure (46) permitting removal and replacement of friction discs (16, 18) without disassembling the brake mechanism. When the brake mechanism is detached from the motor, removal of a single bolt (46) permits radial removal and replacement of the friction discs. Minimizing of brake drag is enabled by adding low force compression springs (162, 164, 166, 168, 170, 172) without otherwise modifying the structure which prevents rotation of the pressure plates (38, 40) relative to the end plate (28) of the brake mechanism (10), wherein a first set of studs (42, 44, 46) provide both functions of non-rotatably mounting the pressure plates (38, 40) to the end plate (28) and mounting the low force compression springs, all separate from another set of studs (70, 72) mounting the brake lever (68) to the end plate (28). The brake solenoid (104) is mounted on another set of studs (122, 124) by resilient shock absorbers (126, 128, 130, 132) which perform dual functions of absorbing mechanical shock from the solenoid plunger (106) at the end of its travel stroke and minimizing solenoid buzz. The latter function is provided in conjunction with simplified single nut(148, 150) adjustment of the solenoid abutment surface (120). Separate cover mounting studs are eliminated, and the cover (98) is mounted on the same set of studs (70 and 72) which mount the brake lever (68). Improved and simplified pivot bearings are provided by hardened drive pins (64 and 66) providing substantially point contact and facilitating smooth pivotal bearing movement of the brake lever (68). A simplified manual release (182) includes a spacer (206) accommodating two friction discs (16, 18).

18 Claims, 6 Drawing Sheets

SIMPLIFIED MOTOR BRAKE

BACKGROUND AND SUMMARY

The invention relates to brake mechanisms for electric motors and the like.

The invention arose during continuing development efforts relating to motor brakes such as shown in U.S. Pat. Nos. 4,798,269, 4,181,201, 4,042,077, 3,878,922, 3,556,266, 3,525,424 and 3,500,971, and as shown in "Stearns Spring-Set Disc Brakes", Catalog No. 200 68910M, Stearns Division, Rexnord Corporation, 1989, and "Stearns Spring-Set Disc Brakes Installation and Service Instructions for Series 48,000", Sheet 300.10A, effective Mar. 21, 1989, page S-700-1, P/N8-078-924-05, Stearns Division, Rexnord Corporation.

The brake mechanism selectively stops or permits rotation of a shaft journaled in the motor frame. One or more friction discs secured to the shaft rotate therewith about the axis of the shaft. An end plate is secured to the motor frame, and has one or more non-rotatable pressure plates mounted thereto for axial movement toward and away from the friction discs. A lever is mounted to the end plate for pivotal movement about bearing surfaces toward and away from the pressure plates. Compression springs bias the lever against the pressure plates such that the pressure plates engage the friction discs and prevent rotation of the motor shaft. A solenoid is secured to the end plate and has a reciprocally movable plunger connected to the lever and movable to a first position moving the lever in one axial direction away from the pressure plates against the bias of the compression springs to release the friction discs and permit rotation of the shaft. The plunger is movable to a second position permitting the lever to move under the bias of the compression springs in the opposite axial direction toward and engaging the pressure plates such that the pressure plates engage the friction discs and prevent rotation of the shaft. This basic structure is common in the industry.

The present invention provides improvements in simplification, cost reduction, ease of maintenance, and enhanced performance and life.

In one aspect of the invention, retention structure is provided permitting quick and easy removal and replacement of the friction discs. Rather than disassembling the entire brake mechanism or substantial portions thereof, only a single bolt need be removed in order to remove and replace the friction discs. This substantially reduces maintenance and service time.

In another aspect of the invention, simplified structure is provided for accepting low force compression springs biasing the pressure plates away from the friction discs in the released condition of the brake to minimize brake drag otherwise caused by contact of the pressure plates and friction discs during rotation of the motor shaft. In vertically mounted orientations of the motor brake, the gravitational weight of the pressure plates themselves may cause brake drag against the friction discs during rotation of the motor shaft. It is known in the prior art to secure leaf springs to the end plate to minimize brake drag. It is also known in the prior art to provide low force compression springs around pins secured to the end plate for performing such function, as shown in "Stearns Spring-Set Disc Brakes Parts List for 55,000 Series", PTC Sheet 309, Oct. 31, 1985, page S-607-1, FIGS. H, I, J, K, and L. In the latter embodiment, the brake must be specially modified by drilling holes in the end plate and in outer tabs of the pressure plates, and inserting pins into such holes, which pins receive the low force compression springs. The present invention accepts low force compression springs without modification of the brake mechanism.

In another aspect of the invention, resilient shock absorbers are provided on studs mounting the solenoid to the end plate. The shock absorbers perform two functions. Firstly, the shock absorbers absorb mechanical shock from the plunger at the end of its travel stroke as it seats against the solenoid abutment surface. Inclusion of the shock absorbers has been found to reduce breakage of parts, which is believed otherwise due to the forceful snap of the plunger. Secondly, the shock absorbers allow simple positioning of the solenoid to minimize solenoid buzz. The solenoid is subject to buzz if the plunger does not seat flushly against the solenoid abutment surface due to the connection of the plunger to the lever. In the prior art, a lock nut on a stud adjusts the position of the solenoid bracket, and another nut on the opposite side of the bracket is tightened to hold the solenoid in place. During adjustment, two wrenches are typically used, one to loosen the nut below the bracket, and the other to tighten the nut above the bracket, or vise versa. In the present invention, the noted second function of the shock absorbers eliminates the two nut and wrench adjustment sequence, and instead only requires a single wrench and nut tightening adjustment.

In another aspect of the invention, part content is reduced by eliminating separate studs otherwise required for mounting the brake mechanism cover. Instead, the studs mounting the high force compression springs are also used to mount the brake mechanism cover.

In another aspect of the invention, improved bearing action and reduced bearing cost is provided. Hardened drive pins with rounded heads are secured to the end plate and provide substantially point contact and smooth pivotal bearing movement of the lever.

In another aspect of the invention, a simplified manual brake release is provided which accommodates one or two friction disc brakes and maintains the desirable function of automatically resetting upon energization of the solenoid, such that when the solenoid is deenergized the brake is effective to stop rotation of the motor shaft.

DETAILED DESCRIPTION

Figure 1:
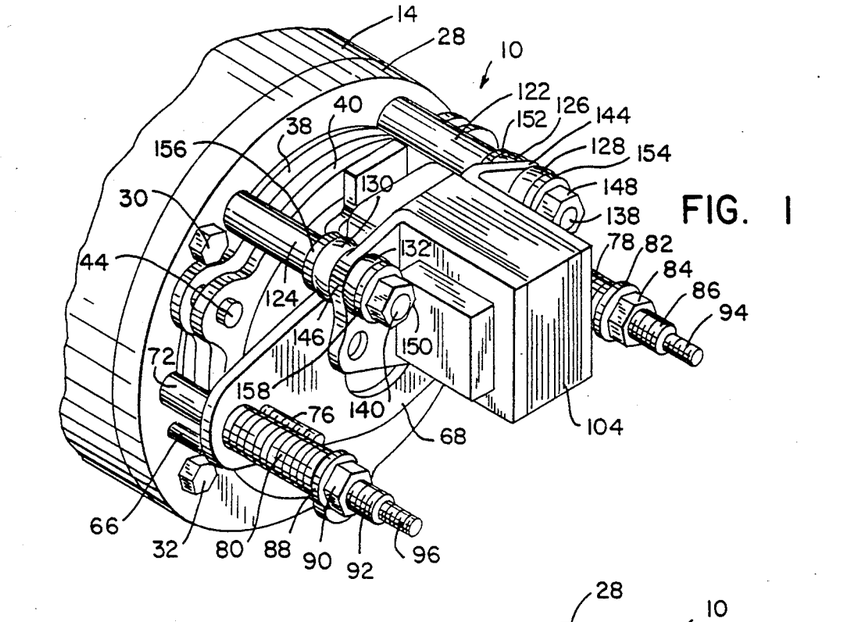
FIG. 1 is a perspective assembly view of a brake mechanism constructed in accordance with the invention.
Figure 2:
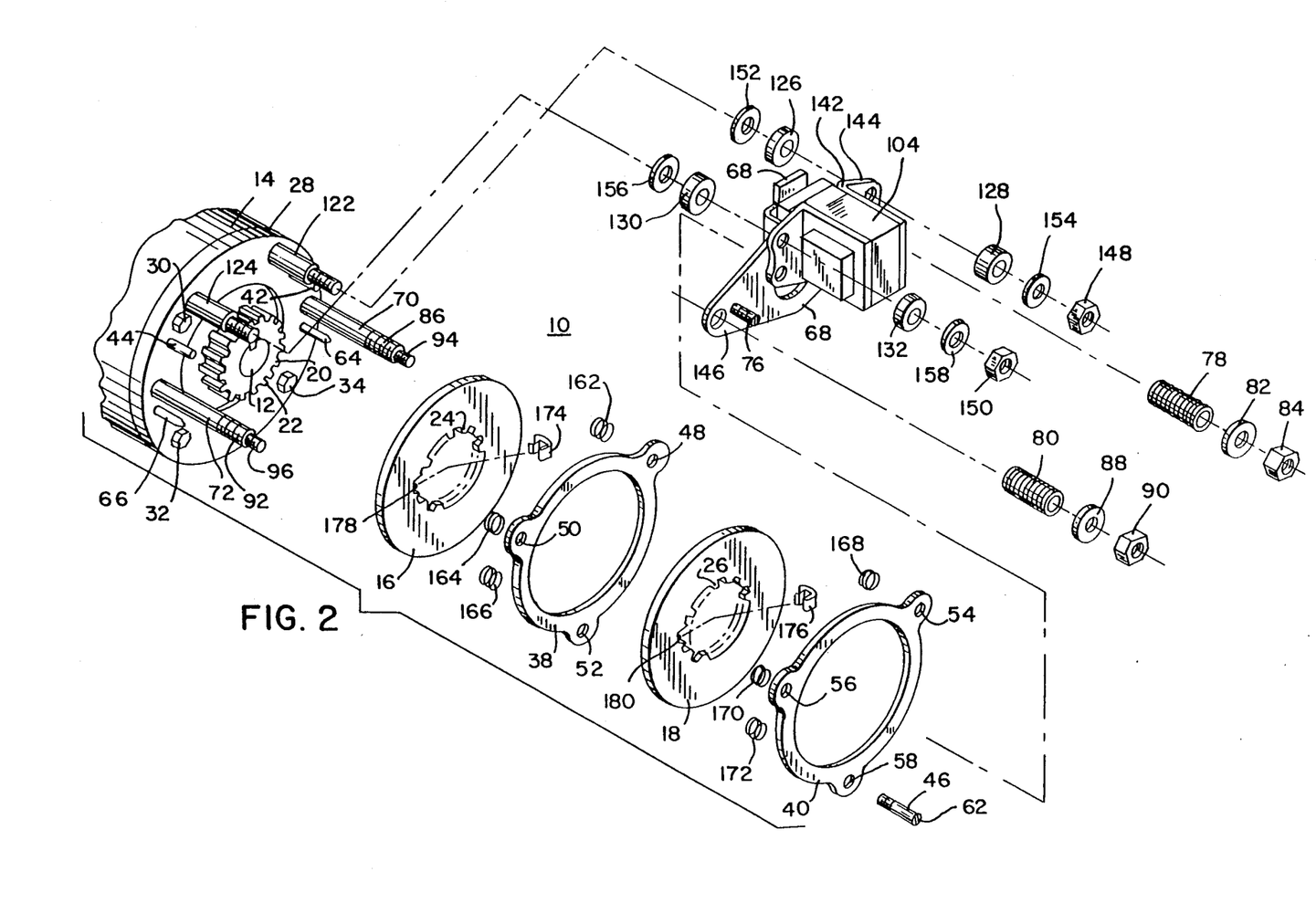
FIG. 2 is an exploded perspective view of the brake mechanism of FIG. 1.

FIGS. 1 and 2 show a brake mechanism 10 for selectively stopping or permitting rotation of a shaft 12 journaled in a motor frame 14. The brake mechanism includes one or more friction discs 16, 18 secured to shaft for rotation therewith about the axis of the shaft. In the embodiment shown, shaft 12 has a keyed hub 20 mounted thereto by set screws, such as 21, FIG. 5, and having circumferential teeth 22 mating with teeth 24 and 26 in the friction discs. The brake mechanism includes an end plate 28 mounted to motor frame 14 by bolts 30, 32, 34, 36, FIGS. 2 and 4. One or more nonrotatable pressure plates 38, 40 are mounted to end plate 28 for axial movement toward and away from friction discs 16, 18. The pressure plates are mounted on a set of axially extending studs 42, 44, 46, and are axially slidable along such studs. The studs extend through respective holes 48, 50, 52 in pressure plate 38 and through respective holes 54, 56, 58 in pressure plate 40. The studs are circumferentially spaced around and radially outward of friction discs 16, 18. Studs 42 and 44 are pins pressed into end plate 28. Stud 46 is a bolt threaded into a threaded hole 60, FIG. 5, in end plate 28, and having a slot 62 in its end for receiving a screwdriver for turning bolt 46 and removing same from end plate 28, for reasons to be described.

Figure 7:
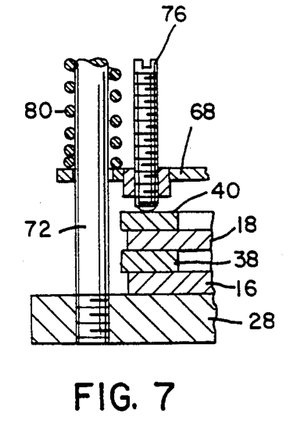
FIG. 7 is a view taken along line 7—7 of FIG. 4.

Bearing means is provided by hardened drive pins 64, 66 press fit into end plate 28. A lever 68 is mounted to end plate 28 by a set of studs 70, 72 which are threaded into end plate 28. Lever 68 pivots about bearings 64, 66 toward and away from pressure plates 40, 38. Lever 68 includes adjustment screws 74, 76, FIG. 4, extending therethrough in threaded relation and engaging pressure plate 40, FIG. 7. Biasing means is provided by compression springs 78, 80 biasing lever 68 and its adjustment screws 74, 76 against pressure plate 40 such that the pressure plates engage the friction discs and prevent rotation of shaft 12. Compression spring 78 is around stud 70, FIG. 5, and is compressed between lever 68 and washer 82 held by nut 84 on threaded portion 86 of stud 70. Compression spring 80 is around stud 72, FIG. 3, and is compressed between lever 68 and washer 88 held by nut 90 on threaded portion 92 of stud 72. Studs 70 and 72 have necked-down threaded portions 94 and 96, respectively, FIGS. 5 and 3, of reduced diameter relative to threaded portions 86 and 92, and extending through a respective aperture in cover 98. Shanked nuts 100 and 102 are threaded onto respective necked-down threaded portions 94 and 96 to secure cover 98 to studs 70 and 72 to enclose the brake mechanism.

Figure 5:
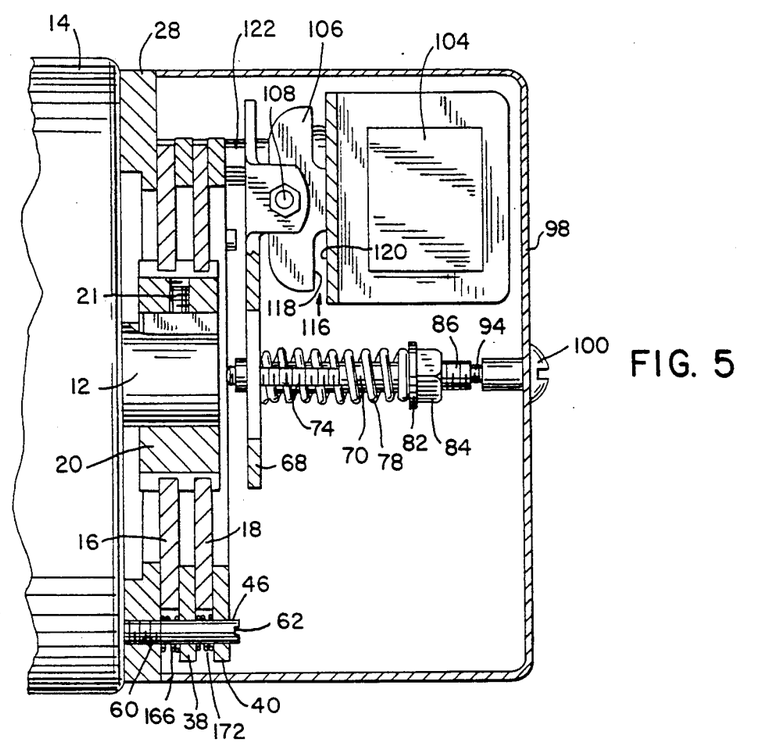
FIG. 5 is a view taken along line 5—5 of FIG. 4.

A solenoid 104 is secured to end plate 28 and has a reciprocally movable plunger 106, FIG. 5, connected to lever 68 by pivot pin 108. Lever 68 has a pair of tabs 110 and 112, FIG. 6, extending perpendicularly therefrom. Pivot pin 108 extends between tabs 110 and 112 and through plunger 106, and is secured by locknut 114. Plunger 106 is movable in a first axial direction, rightwardly in FIG. 5, to a first position moving lever 68 in the one axial direction away from pressure plate 40 and against the bias of compression springs 78, 80 to release friction discs 16, 18 and permit rotation of shaft 12. Solenoid 104 is electrically wired to be energized at the same time the electric motor is energized. Upon energization of solenoid 104, plunger 106 is magnetically attracted rightwardly in FIG. 5 to close gap 116, such that plunger surface 118 engages solenoid abutment surface 120. Upon de-energization of the solenoid, plunger 106 moves in the other axial direction, leftwardly in FIG. 5, to the position as shown in FIG. 5, permitting lever 68 to move under the bias of compression springs 78, 80 in the leftward axial direction toward and engaging pressure plate 40 such that the pressure plates engage the friction discs and prevent rotation of shaft 12. Adjustment screws 74, 76 of lever 68 adjust the range of motion through which lever 68 travels to engage pressure plate 40 at the leftward ends of screws 74, 76. Rotation of adjustment screws 74, 76 also compensates for wear experienced by the friction discs.

Figure 6:
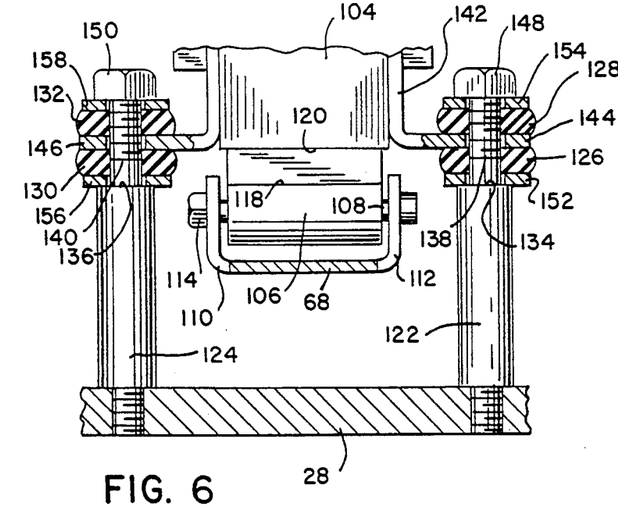
FIG. 6 is a view taken along line 6—6 of FIG. 4.

Solenoid 104 is mounted to end plate 28 by a set of studs 122, 124 which are threaded into end plate 28, FIGS. 2 and 6. Solenoid 104 is mounted on studs 122, 124 in cushioned relation by resilient shock absorbing means provided by silicon washers 126, 128, 130, 132. Studs 122, 124 have respective shoulders 134, 136, and respective threaded ends 138, 140 extending from such shoulders. Solenoid 104 is mounted between studs 122 and 124 and has a bracket 142 with distally opposite flanges 144 and 146 secured to threaded ends 138 and 140 of studs 122 and 124. Adjustment means is provided by nuts 148 and 150 threaded on respective stud ends 138 and 140. Resilient washer 126 is around threaded end 138 of stud 122 and is compressed between bracket flange 144 and steel washer 152 on shoulder 134. Resilient washer 128 is around threaded end 138 of stud 122 and is compressed between bracket flange 144 and steel washer 152 against nut 148. Resilient Washer 130 is around threaded end 140 of stud 124 and is compressed between bracket flange 146 and steel washer 156 on shoulder 136. Resilient washer 132 is around threaded end 140 of stud 124 and is compressed between bracket flange 146 and steel washer 158 against nut 150.

Resilient washers 126, 128, 130, 132 absorb mechanical shock from plunger 106 at the end of its travel stroke. The resilient washers also minimize solenoid buzz. The solenoid is subject to buzz if plunger surface 118 does not seat flushly against abutment surface 120 due to the connection of plunger 106 to lever 68. Pivot pin 108 allows flush engagement in the horizontal plane in FIG. 6 relative to the pivot axis along pin 108. However, surfaces 118 and 120 in the horizontal plane are still subject to non-flush engagement if side to side adjustment is not provided by adjusting bracket flanges 144 and/or 146 vertically along respective studs 122 and 124. In the prior art, for example, a lock nut is provided below bracket flange 144 and another nut is provided above flange 144, and the two nuts are adjusted until surfaces 118 and 120 seat flushly against each other when the solenoid is energized. In the present invention, the two nut adjustment is replaced by a single nut adjustment. Nut 148 is tightened or loosened to provide the desired flush engagement of surfaces 118 and 120 and minimize buzz. Nut 148 adjustably compresses the shock absorbing resilient washers 126 and 128 to adjust the plane of abutment surface 120 to match and flushly engage plunger 106 at surface 118. Nuts 148 and 150 are the sole means of adjusting side to side orientation of solenoid abutment surface 120 between studs 122 and 124, without adjusting stop nuts between shoulder 134 and bracket flange 144 and/or between shoulder 136 and bracket flange 146. The shock absorbers thus perform the dual functions of absorbing mechanical shock and minimizing solenoid buzz.

During development, 90 durometer 3/16" thick urethane washers were initially tried, but were not satisfactory. It is believed that these were not successful because the 90 durometer rating was too hard and caused mechanical damage to the solenoid bracket, and also because the heat of the brake made the urethane hard. It was found that 70 durometer 3/16" thick silicone sheet washers were successful. The 70 durometer rating provides desired softness, and the silicone provides a higher temperature material. It was found that temperature did not affect the washers, and that the washers absorbed much of the damage-producing shock. These washers were also found to afford sufficient adjustment range to minimize solenoid buzz.

Figure 8:
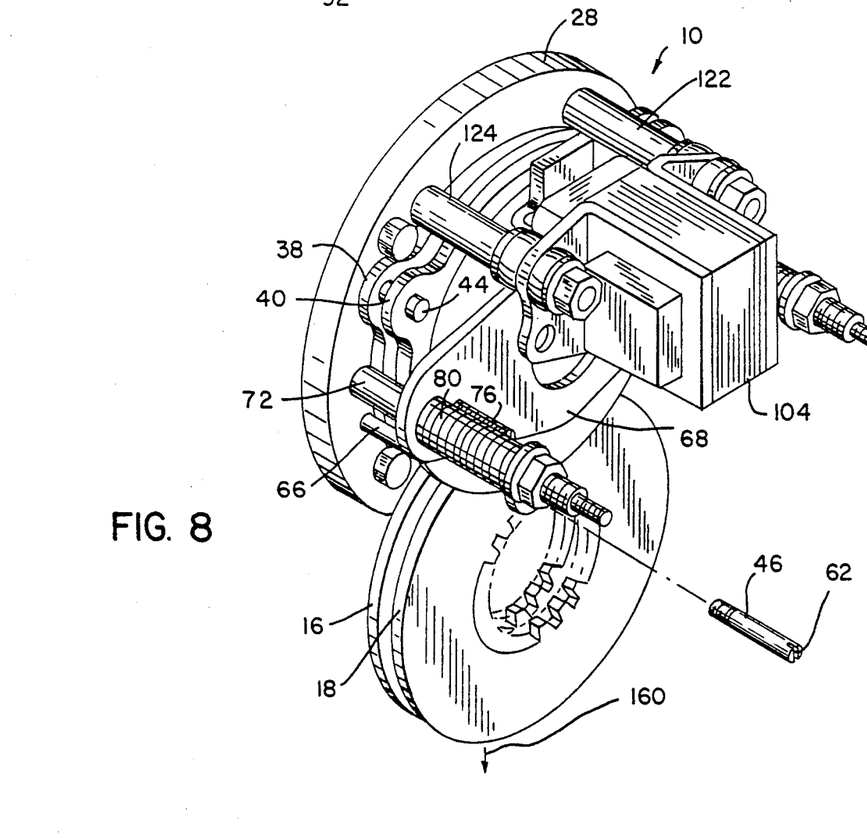
FIG. 8 is a view like FIG. 1 and illustrates removal and replacement of friction discs.
Figure 9:
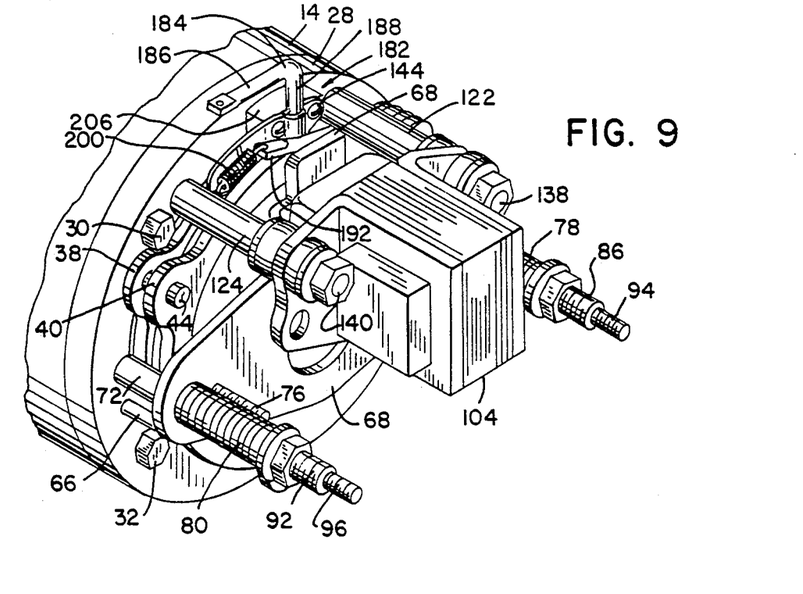
FIG. 9 is a view like FIG. 1 and shows a further embodiment.
Figure 10:
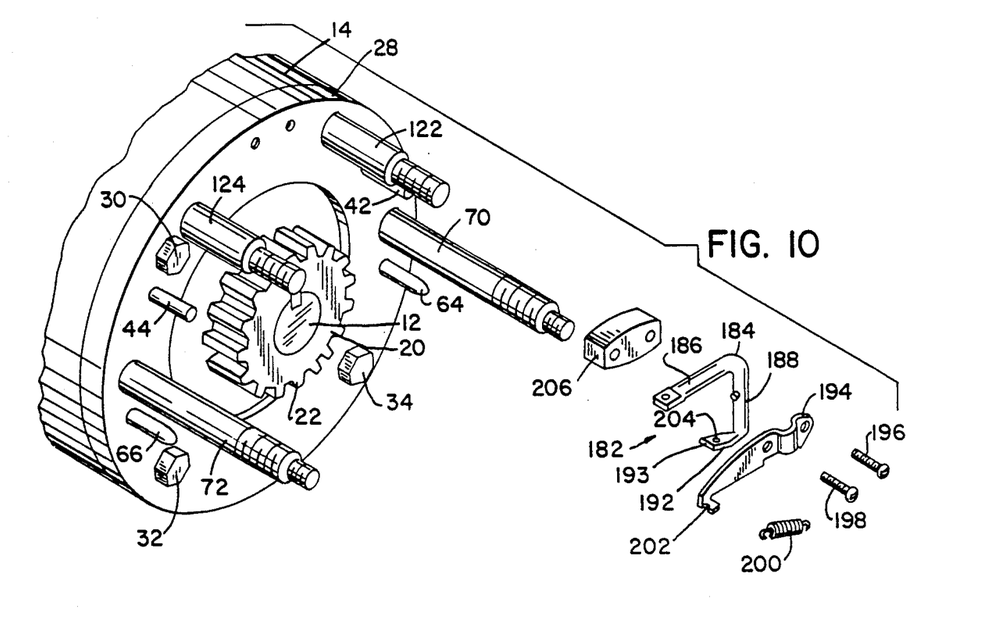
FIG. 10 is an exploded perspective view of the brake mechanism of FIG. 9.
Figure 11:
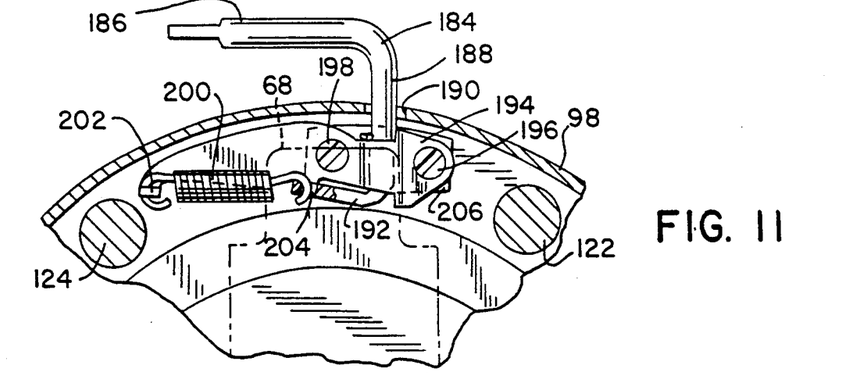
FIG. 11 is an end view of a portion of the structure in FIG. 9.
Figure 12:
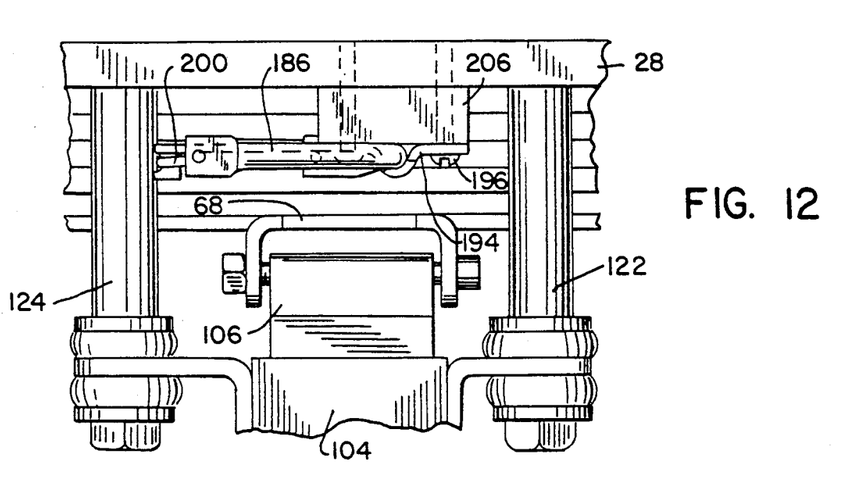
FIG. 12 is a top view of the structure in FIG. 11.

Brake mechanism 10 has an installed condition mounted to motor frame 14, FIG. 1, and a detached condition removed from the motor frame, FIG. 8. Brake mechanism 10 is a self-contained assembled unit in each of such conditions. The variously noted studs extending axially from end plate 28 additionally provide retaining means retaining friction discs 16, 18 generally in axial alignment with pressure plates 38, 40. The studs are circumferentially spaced around and radially outward of the friction discs. The stud provided by bolt 46 permits removal and replacement of friction discs 16, 18 in the detached condition of brake mechanism 10, FIG. 8, without disassembly of the brake mechanism. This is in contrast to prior devices wherein substantial disassembly of the brake mechanism is necessary in order to remove and replace the friction discs. In the present invention, the friction discs are removed and replaced by removing solely a single one of the studs, namely stud 46. The rest of the studs remain secured to end plate 28 during removal and replacement of the friction discs. Stud 46 is turned by a screwdriver in slot 62 to detach stud 46 from end plate 28. This enables the friction discs to be removed in a radial direction 160, FIG. 8, relative to the axis of rotation of motor shaft 12. Stud 46 thus affords single bolt removal permitting removal and replacement of the friction discs, i.e., the friction discs may be removed and replaced by removing solely a single bolt. This substantially reduces service and maintenance time.

A set of compression springs 162, 164, 166 are provided around respective studs 42, 44, 46 between pressure plate 38 and end plate 28, and another set of compression springs 168, 170, 172 are provided around respective studs 42, 44, 46 between pressure plates 40 and 38. Compression springs 162, 164, 166, 168, 170, 172 are substantially lower force than compression springs 78 and 80, and bias the pressure plates away from the friction discs when solenoid 104 is energized and the brake is released, to minimize brake drag caused by contact of the pressure plates and the friction discs during rotation of motor shaft 12. When the motor and brake are mounted in a vertically oriented position, the gravitational weight of the pressure plates themselves may cause drag on the friction discs and create heat and cause unnecessary wear and shortened life. As noted above, it is known in the prior art to provide leaf springs mounted to the end plate for such purpose, and it is also known to provide small low force compression springs for such purpose as shown in the above noted "Stearns Spring-Set Disc Brakes Parts List for 55,000 Series" reference, FIGS. G, H, I, J, K. In the latter embodiment, the structure is modified by drilling holes in the end plate and in the pressure plates and inserting pins for receiving the low force compression springs. In the present invention, the minimizing of brake drag is enabled by adding the low force compression springs around studs 42, 44, 46 without otherwise modifying the structure which prevents rotation of pressure plates 38, 40 relative to end plate 28. The set of studs 42, 44, 46 provides both functions of non-rotatably mounting pressure plates 38, 40 to end plate 28 and mounting low force compression springs 162, 164, 166, 168, 170, 172, all separate from the set of studs 70, 72 mounting lever 68 to end plate 28.

Figure 4:
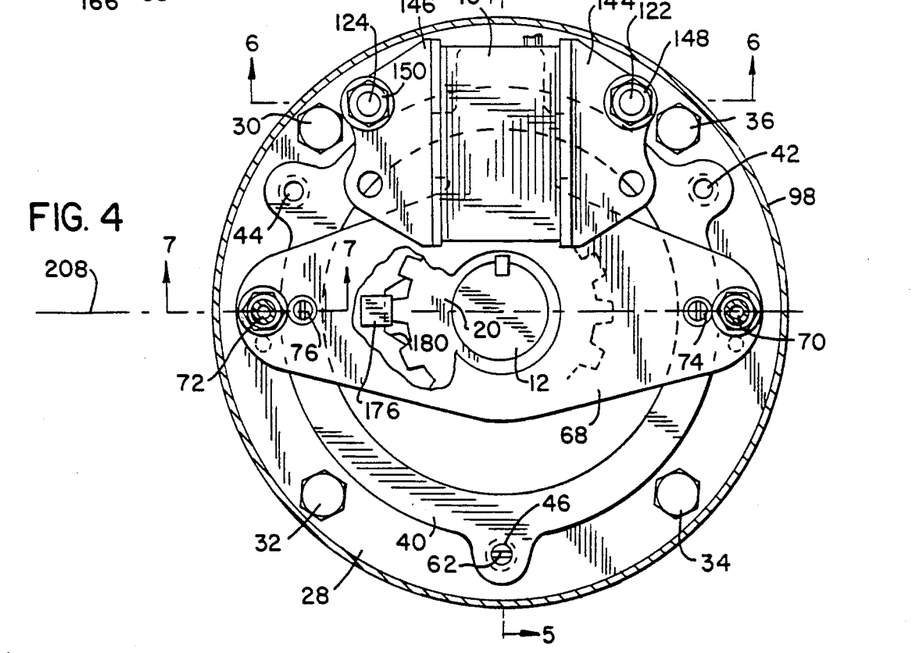
FIG. 4 is a view taken along line 4—4 of FIG. 3.

Low force compression springs 162, 164, 166, 168, 170, 172 also provide noise suppression comparably to anti-rattle leaf spring 84 in above noted U.S. Pat. No. 4,798,269. Additional noise suppression is provided by hub stabilizing springs 174, 176, FIGS. 2 and 4, comparable to hub stabilizing spring 92 of U.S. Pat. No. 4,798,269. Hub stabilizing springs 174, 176 are disposed between an outer edge of a respective tooth 22 of hub 20 and a respective inner radial surface 178, 180 of the respective friction disc 16, 18. Hub stabilizing springs 174, 176 apply a slight radial force against the friction discs to take up backlash and eliminate backlash noise that occurs between hub 20 and friction discs 16, 18 when the motor is started and stopped, as in U.S. Pat. No. 4,798,269.

Hardened drive pins 64 and 66 have been found to provide bearing means which is more economical than past practice and which also enhances the bearing action. The drive pins eliminate the need to form a separate stamping attached to the end plate and of a necessary stock and radius to provide a bearing surface. Instead, pins 64 and 66 have rounded heads providing substantially point contact. Lever 68 is a hardened plate member. The point contact between the rounded heads of the pins and the plate member facilitate smooth pivotal bearing movement of lever 68 by engagement of hardened surfaces in point contact.

In a further embodiment, a manual brake release 182, FIGS. 9–13, is provided, and functions similarly to manual brake release lever 96 in U.S. Pat. No. 4,798,269. The manual brake release includes a release arm 184 having a manually engageable outer section 186 extending externally of the cover 98. Release arm 184 has a central section 188 mounted to end plate 28 and rotatable about central portion 188 between a first position, FIG. 13, and a second position, FIG. 12. Central section 188 of release arm 184 extends through opening 190, FIG. 11, in cover 98. Release arm 184 has an inner section 192 with a flat end 193 engaging lever 68 in the first position of release arm 184, FIG. 13, to hold solenoid plunger 106 in a retracted position in the rightward axial direction, FIG. 5, away from pressure plates 38, 40 against the bias of biasing springs 78, 80 to release the friction discs 16, 18 and permit rotation of shaft 12. Inner section 192 of release arm 184 disengages lever 68 in the second position of release arm 184, FIG. 12, to permit lever 68 to move under the bias of biasing springs 78, 80 in the leftward axial direction, FIG. 5, toward and engaging pressure plates 38, 40 such that pressure plates 38, 40 engage friction discs 16, 18 and prevent rotation of shaft 12. Inner section 192 of release arm 184 extends generally perpendicularly away from central section 188. Outer section 186 of release arm 184 extends generally perpendicularly away from central section 188.

Release arm 184 is mounted to end plate 28 by a bracket 194 secured by screws 196, 198. A tension spring 200 extends between bracket 194 at catch 202 and the release arm inner section 192 at hole 204. Tension spring 200 biases release arm 184 to the noted second position, FIG. 12. A spacer 206 is provided between bracket 194 and end plate 28 and spaces bracket 194 and release arm 184 axially rightwardly, FIGS. 9 and 10, from end plate 28. Spacer 206 is used when there are two friction discs such as 16, 18. Spacer 206 is eliminated when there is one friction disc.

Figure 3:
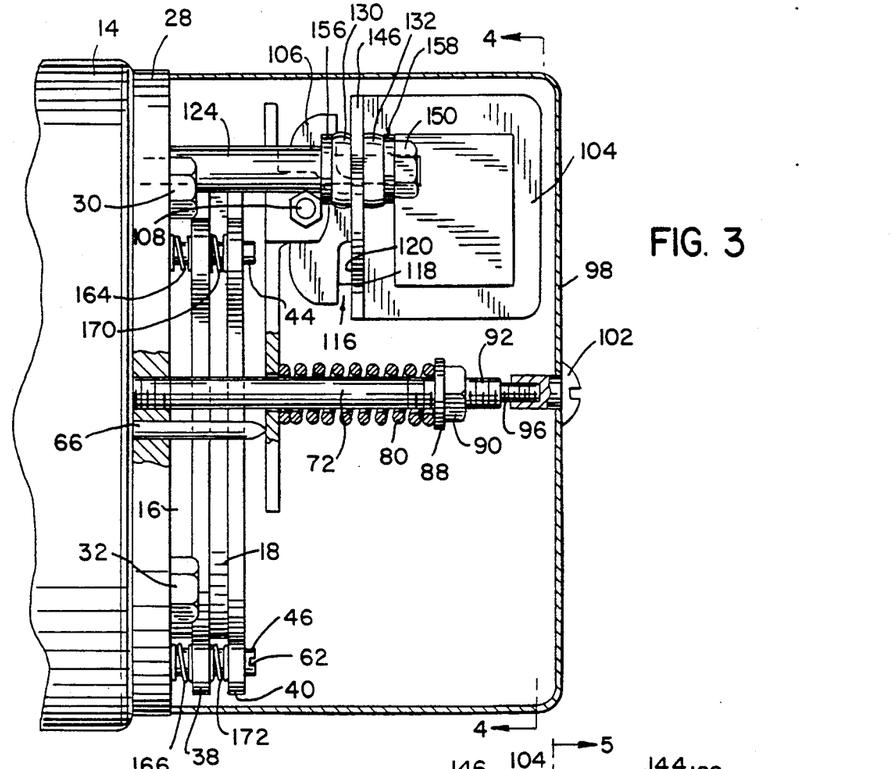
FIG. 3 is a side view of the brake mechanism of FIG. 1, partially in section, and including the brake mechanism cover.
Figure 13:
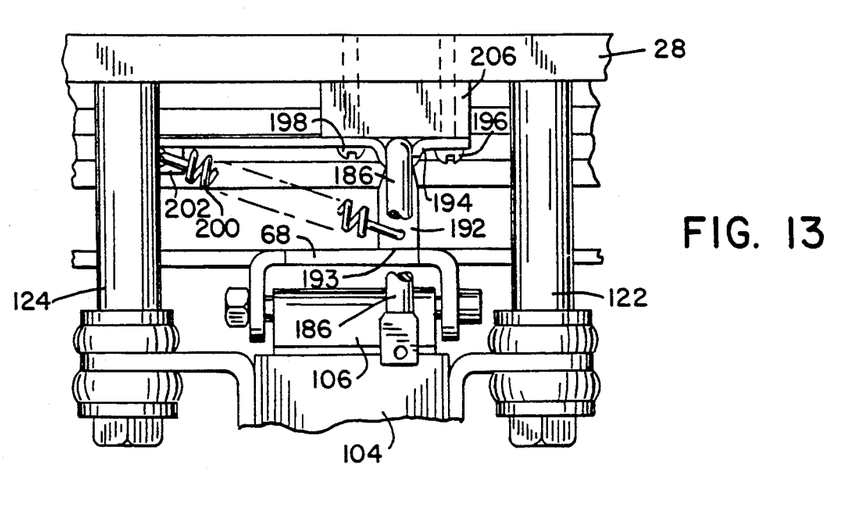
FIG. 13 is a view like FIG. 12 and shows another position of the release arm.

Inner section 192 of release arm 184 does not hold lever 68 in FIG. 13 to a fully retracted position of solenoid plunger 106, such that gap 116, FIG. 3, is not fully closed. Thus, when solenoid 104 is energized, plunger 106 will be able to retract slightly, i.e. move rightwardly in FIG. 3, and disengage inner section 192 of the release arm, so that tension spring 200 will pull inner section 192 leftwardly in FIG. 13 and rotate release arm 184 clockwise by 90° from the position shown in FIG. 13 to the position shown in FIG. 12. Hence, the manual release arm is automatically disengaged and reset, such that when the solenoid is de-energized, the motor brake is effective to stop rotation of motor shaft 12. For the manual brake release 182 to be effective again, outer section 186 of arm 184 must be manually re-engaged by the operator and moved to rotate release arm 184 counter-clockwise by 90° from the position shown in FIG. 12 to the position shown in FIG. 13. The automatic reset function is also provided by brake release lever 96 in U.S. Pat. No. 4,798,269.

In the preferred embodiment, the solenoid mechanical advantage is 5.75 to 1. The spring set mechanical advantage of compression springs 78, 80 is 6.5 to 1. The brake has a transverse centerline shown at 208 in FIG. 4 extending transversely of and intersecting the axis of rotation of motor shaft 12. Adjustment screws 74 and 76 of lever 68 are slightly offset from centerline 208 toward solenoid 104. Compression springs 78 and 80 are at centerline 208.

It is recognized that various equivalents, alternatives and modifications are possible within the scope of the appended claims.

We claim:

1. A brake mechanism for selectively stopping or permitting rotation of a shaft journaled in a motor frame, comprising:
   friction disc means secured to said shaft for rotation therewith about the axis of said shaft;
   end plate means secured to said motor frame;
   non-rotatable pressure plate means mounted to said end plate means for axial movement toward and away from said friction disc means;
   bearing means secured to said end plate means;
   lever means mounted to said end plate means for pivotal movement about said bearing means toward and away from said pressure plate means;
   biasing means biasing said lever means against said pressure plate means such that said pressure plate means engages said friction disc means and prevents rotation of said shaft;
   solenoid means secured to said end plate means and having a reciprocally movable plunger connected to said lever means and movable to a first position moving said lever means in one axial direction away from said pressure plate means against the bias of said biasing means to release said friction disc means and permit rotation of said shaft, and movable to a second position permitting said lever means to move under the bias of said biasing means in the opposite axial direction toward and engaging said pressure plate means such that said pressure plate means engages said friction disc means and prevents rotation of said shaft;
   said brake mechanism having an installed condition mounted to said motor frame, and a detached condition removed from said motor frame, said brake mechanism being a self-contained assembled unit in each of said conditions;
   retaining means retaining said friction disc means in axial alignment with said pressure plate means and permitting removal and replacement of said friction disc means in said detached condition of said brake mechanism without disassembly of said brake mechanism.

2. The invention according to claim 1 wherein said retaining means comprises a plurality of studs spaced circumferentially around said friction disc means, and wherein said friction disc means is removed and replaced by removing solely a single one of said studs.

3. The invention according to claim 2 wherein said one stud comprises a bolt threaded into said end plate means, said bolt being detached from said end plate means during said removal and replacement of said friction disc means, the remainder of said studs remaining secured to said end plate means during said removal and replacement of said friction disc means.

4. The invention according to claim 3 wherein said friction disc means is removed radially of said axis.

5. The invention according to claim 1 wherein said retaining means comprises bolt means providing single bolt removal permitting said removal and replacement of said friction disc means, said single bolt being attached to said end plate means and retaining said friction disc means in axial alignment with said pressure plate means, including in said second condition of said brake mechanism with said shaft removed from said friction disc means, said single bolt being detached from said end plate means during said removal and replacement of said friction disc means.

6. The invention according to claim 1 wherein said retaining means permits removal and replacement of said friction disc means in a radial direction relative to said axis.

7. The invention according to claim 1 comprising a plurality of studs non-rotatably mounting said pressure plate means to said end plate means and spaced circumferentially around said friction disc means, one of said studs comprising a removable bolt threaded into said end plate means, said bolt being detached from said end plate means during said removal and replacement of said friction disc means and permitting said removal and replacement of said friction disc means in a radial direction relative to said axis.

8. A brake mechanism for selectively stopping or permitting rotation of a shaft journaled in a motor frame, comprising:
   friction disc means mounted to said shaft for rotation therewith about the axis of said shaft;
   end plate means secured to said motor frame;
   pressure plate means non-rotatably mounted to said end plate means by a first set of studs, said pressure plate means being axially slidable along said studs toward and away from said friction disc means;
   bearing means secured to said end plate means;

lever means mounted to said end plate means by a second set of studs different than said first set of studs, said lever means pivoting about said bearing means toward and away from said pressure plate means;

biasing means biasing said lever means against said pressure plate means such that said pressure plate means engages said friction disc means and prevents rotation of said shaft;

solenoid means secured to said end plate means and having a reciprocally movable plunger connected to said lever means and movable to a first position moving said lever means in one axial direction away from said pressure plate means against the bias of said biasing means to release said friction disc means and permit rotation of said shaft, and movable to a second position permitting said lever means to move under the bias of said biasing means in the opposite axial direction toward and engaging said pressure plate means such that said pressure plate means engages said friction disc means and prevents rotation of said shaft.

9. The invention according to claim 8 wherein said biasing means comprises high force compression springs around said studs of said second set, and comprising low force compression springs around said studs of said first set and biasing said pressure plate means away from said friction disc means in said first position of said plunger to minimize brake drag caused by contact of said pressure plate means and said friction disc means during rotation of said shaft, said minimizing of brake drag being enabled by adding said low force compression springs around said studs of said first set without otherwise modifying the structure which prevents rotation of said pressure plate means relative to said end plate means, said first set of studs providing both functions of non-rotatably mounting said pressure plate means to said end plate means and mounting said low force compression springs, all separate from said second set of studs mounting said lever means to said end plate means.

10. The invention according to claim 8 wherein one of said studs of said first set is removable and permits removal and replacement of said friction disc means without removing any other studs of said first and second sets.

11. A brake mechanism for selectively stopping or permitting rotation of a shaft journaled in a motor frame, comprising:

friction disc means secured to said shaft for rotation therewith about the axis of said shaft;

end plate means secured to said motor frame;

non-rotatable pressure plate means mounted to said end plate means for axial movement toward and away from said friction disc means;

bearing means secured to said end plate means;

lever means mounted to said end plate means for pivotal movement about said bearing means toward and away from said pressure plate means;

biasing means biasing said lever means against said pressure plate means such that said pressure plate means engages said friction disc means and prevents rotation of said shaft;

stud means extending from said end plate means;

solenoid means mounted on said stud means in cushioned relation by resilient shock absorbing means, said solenoid means having a reciprocally movable plunger connected to said lever means and movable to a first position moving said lever means in one axial direction away from said pressure plate means against the bias of said biasing means to release said friction disc means and permit rotation of said shaft, and movable to a second position permitting said lever means to move under the bias of said biasing means in the opposite axial direction toward and engaging said pressure plate means such that said pressure plate means engages said friction disc means and prevents rotation of said shaft, said shock absorbing means absorbing mechanical shock from said plunger at the end of its travel stroke, wherein said solenoid includes an abutment surface against which said plunger seats at the end of its travel stroke, said solenoid being subject to buzz if said plunger does not seat flushly against said abutment surface due to the connection of said plunger to said lever means, and comprising adjustment means for adjustably compressing said shock absorbing means to adjust the plane of said abutment surface to match and flushly engage said plunger, such that said shock absorbing means performs the dual functions of absorbing mechanical shock and minimizing solenoid buzz.

12. The invention according to claim 11 wherein said stud means comprises first and second studs each having a shoulder and a threaded end extending from said shoulder, said solenoid is mounted between said studs and has a bracket with distally opposite first and second flanges secured to said threaded ends of said studs, said adjustment means comprises first and second nuts each threaded on a respective said stud end, said shock absorbing means comprises first, second, third, and fourth resilient washers, said first resilient washer being around said threaded end of said first stud between the stud shoulder and said first bracket flange, said second resilient washer being around said threaded end of said first stud between said first nut and said first bracket flange, said third resilient washer being around said threaded end of said second stud between the stud shoulder and said second bracket flange, said fourth resilient washer being around said threaded end of said second stud between said second nut and said second bracket flange, said first and second nuts being the sole means of adjusting side to side orientation of said solenoid abutment surface between said studs, without adjusting stop nuts between said shoulders and said flanges of said bracket.

13. The invention according to claim 12 wherein each of said resilient washers is an approximately 70 durometer silicone washer.

14. A brake mechanism for selectively stopping or permitting rotation of a shaft journaled in a motor frame, comprising:

friction disc means secured to said shaft for rotation therewith about the axis of said shaft;

end plate means secured to said motor frame;

non-rotatable pressure plate means mounted to said end plate means for axial movement toward and away from said friction disc means;

bearing means secured to said end plate means;

lever means mounted to said end plate means for pivotal movement about said bearing means toward and away from said pressure plate means;

biasing means biasing said lever means against said pressure plate means such that said pressure plate means engages said friction disc means and prevents rotation of said shaft;

solenoid means secured to said end plate means and having a reciprocally movable plunger connected to said lever means and movable to a first position moving said lever means in one axial direction away from said pressure plate means against the bias of said biasing means to release said friction disc means and permit rotation of said shaft, and movable to a second position permitting said lever means to move under the bias of said biasing means in the opposite axial direction toward and engaging said pressure plate means such that said pressure plate means engages said friction disc means and prevents rotation of said shaft;

manual brake release means comprising a release arm having a manually engageable outer section, a central section rotatably mounted to said end plate means and axially spaced therefrom by a spacer and rotatable between first and second positions, and an inner section engaging said lever means in said first position of said release arm to hold said plunger toward said one axial direction away from said pressure plate means against the bias of said biasing means to release said friction disc means and permit rotation of said shaft, said inner section of said release arm disengaging said lever means in said second position of said release arm to permit said lever means to move under the bias of said biasing means in said opposite axial direction toward and engaging said pressure plate means such that said pressure plate means engages said friction disc means and prevents rotation of said shaft.

15. The invention according to claim 14 wherein said friction disc means comprises a pair of friction discs, and said pressure plate means comprises a pair of pressure plates, and wherein said release arm is mounted to said end plate means by a bracket, and wherein said spacer is between said bracket and said end plate means and spaces said bracket and said release arm axially from said end plate means.

16. The invention according to claim 15 comprising a tension spring extending between said bracket and said inner section of said release arm and biasing said release arm to said second position of said release arm.

17. The invention according to claim 16 wherein said release arm rotates about said central section of said release arm, and wherein said inner section of said release arm extends generally perpendicularly from said central section of said release arm, and wherein said outer section of said release arm extends generally perpendicularly from said central section of said release arm.

18. A brake mechanism for selectively stopping and permitting rotation of a shaft journaled in a motor frame, comprising:

friction disc means secured to said shaft for rotation therewith about the axis of said shaft;

end plate means secured to said motor frame;

pressure plate means non-rotatably mounted to said end plate means by a first set of studs spaced circumferentially around said friction disc means, said pressure plate means being axially slidable along said studs toward and away from said friction disc means, one of said studs comprising a removable bolt threaded into said end plate means;

bearing means comprising a pair of hardened drive pins secured to said end plate means;

lever means mounted to said end plate means by a second set of studs different than said first set of studs, said lever means pivoting about said pins toward and away from said pressure plate means, said pins having rounded heads providing substantially point contact and facilitating smooth pivotal bearing movement of said lever means;

biasing means comprising high force compression springs around said studs of said second set and biasing said lever means against said pressure plate means such that said pressure plate means engages said friction disc means and prevents rotation of said shaft;

solenoid means secured to said end plate means by a third set of studs different than said first and second sets of studs, said solenoid means having a reciprocally movable plunger connected to said lever means and movable to a first position moving said lever means in one axial direction away from said pressure plate means against the bias of said biasing means to release said friction disc means and permit rotation of said shaft, and movable to a second position permitting said lever means to move under the bias of said biasing means in the opposite axial direction toward and engaging said pressure plate means such that said pressure plate means engages said friction disc means and prevents rotation of said shaft, said solenoid including an abutment surface against which said plunger seats at the end of its travel stroke, said solenoid being subject to buzz if said plunger does not seat flushly against said abutment surface due to the connection of said plunger to said lever means;

resilient shock absorbing means mounting said solenoid means on said studs of said third set in cushioned relation, said shock absorbing means absorbing mechanical shock from said plunger at the end of its travel stroke;

adjustment means adjustably compressing said shock absorbing means to adjust the plane of said abutment surface to match and flushly engage said plunger, such that said shock absorbing means performs the dual functions of absorbing mechanical shock and minimizing solenoid buzz;

low force compression springs around said studs of said first set and biasing said pressure plate means away from said friction disc means in said first position of said plunger to minimize brake drag caused by contact of said pressure plate means and said friction disc means during rotation of said shaft, said minimizing of brake drag being enabled by adding said low force compression springs around said studs of said first set without otherwise modifying the structure preventing rotation of said pressure plate means relative to said end plate means, said first set of studs providing both functions of non-rotatably mounting said pressure plate means to said end plate means and also mounting said low force compression springs, all separate from said second and third sets of studs;

said brake mechanism having an installed condition mounted to said motor frame, and a detached condition removed from said motor frame, said brake mechanism being a self-contained assembled unit in each of said conditions;

said friction disc means being removed and replaced in said detached condition of said brake mechanism without disassembly of said brake mechanism by removing said threaded bolt of said first set of studs without removing any other studs of said first, second and third sets, said removal of said bolt permitting removal and replacement of said friction disc means in a radial direction relative to said axis.

* * * * *